US010518711B2

(12) United States Patent
Bokulic

(10) Patent No.: US 10,518,711 B2
(45) Date of Patent: Dec. 31, 2019

(54) INERTIA DEVICE IN AN ARMREST CONSOLE

(71) Applicant: Ford Global Technologies LLC, Dearborn, MI (US)

(72) Inventor: Josip Bokulic, Altona (AU)

(73) Assignee: Ford Global Technologies LLC, Dearborn, MI (US)

( * ) Notice: Subject to any disclaimer, the term of this patent is extended or adjusted under 35 U.S.C. 154(b) by 7 days.

(21) Appl. No.: 16/014,930

(22) Filed: Jun. 21, 2018

(65) Prior Publication Data

US 2019/0061630 A1 Feb. 28, 2019

(30) Foreign Application Priority Data

Aug. 29, 2017 (CN) .......................... 2017 1 0758609

(51) Int. Cl.
*B60R 7/04* (2006.01)
*B60N 2/75* (2018.01)
*B60R 11/00* (2006.01)

(52) U.S. Cl.
CPC ................ *B60R 7/04* (2013.01); *B60N 2/793* (2018.02); *B60R 2011/0007* (2013.01); *B60R 2011/0085* (2013.01)

(58) Field of Classification Search
CPC .. B60R 7/04; B60R 7/046; B60R 7/06; B60R 7/00; B60R 5/00; B60R 2011/0007
USPC .......................... 296/37.1, 37.12–37.16, 37.8
See application file for complete search history.

(56) References Cited

U.S. PATENT DOCUMENTS

| 6,802,550 B1 * | 10/2004 | Griggs, Jr. ................ B60R 7/04 296/24.34 |
| 8,191,953 B2 | 6/2012 | Simon et al. |
| 9,551,247 B2 * | 1/2017 | Michel ................ F01M 11/064 |
| 2016/0272093 A1 | 9/2016 | Jakubec et al. |

FOREIGN PATENT DOCUMENTS

| CN | 205344596 U | 6/2016 | |
| DE | 102008023214 A1 | 11/2009 | |
| KR | 20110001710 A | 1/2011 | |
| WO | WO-2018141518 A1 * | 8/2018 | ............. E05B 77/12 |

OTHER PUBLICATIONS http://techinfo.honda.com/rjanisis/pubs/OM/AD0606/AD0606O00096A.pdf.
http://drivers.lexus.com/t3Portal/document/om/OM50738U/pdf/om07sour/2007om/frame/07ls460o/sec_03_07.pdf.

* cited by examiner

*Primary Examiner* — Dennis H Pedder
(74) *Attorney, Agent, or Firm* — Vichit Chea; Kolitch Romano LLP

(57) ABSTRACT

An inertia device is provided for attaching under a cover of an armrest console in a vehicle. The inertia device comprises a flap to be pivotally connected to a lower surface of the cover at a location adjacent to a front of the cover; and a resilient member connected to the flap and the cover. The flap and the resilient member are configured such that the flap is maintained at a normal position by a retaining force of the resilient member and rotated downward from the normal position when a g-force applied to the flap exceeds a predetermined level.

20 Claims, 5 Drawing Sheets

INERTIA DEVICE IN AN ARMREST CONSOLE

RELATED APPLICATION

This application claims the benefit of Chinese Patent Application No.: CN 201710758609.9 filed on Aug. 29, 2017, the entire contents thereof being incorporated herein by reference.

FIELD

The present disclosure relates generally to an inertial device used in an armrest console in a vehicle, in particular, relates to an inertia device to block an opening between a storage tray and an armrest console cover when a G-force exceed a predetermined level.

BACKGROUND

An armrest console in some vehicles includes a storage tray in a storage compartment to store small items such as coins, pens, keys and mobile phones. In some designs, there is a gap or an opening between the storage tray and an armrest cover at a closed position of the armrest cover. The storage tray is usually shallow. The inventor of the present application has recognized the need to have a device to prevent the items to exit the storage tray when a G-force exceeds a predetermined level.

SUMMARY

According to one aspect, an inertia device in an armrest console is provided for attaching under a cover of the armrest console. The inertial device comprises a flap to be pivotally connected to a lower surface of the cover at a location adjacent to a front of the cover; and a resilient member connected to the flap and the cover. The flap and the resilient member are configured such that the flap is maintained at a normal position by a retaining force of the resilient member and rotated downward from the normal position when a g-force applied to the flap exceeds a predetermined level.

In one embodiment, the flap may have a first edge to be pivotally connected to the lower surface of the cover, a second edge opposite to the first edge and a main surface extending therebetween.

In another embodiment, the resilient member may include two springs disposed adjacent to two ends of the first edge of the flap.

In another embodiment, the resilient member may include one spring disposed in a middle of the first edge of the flap.

In another embodiment, a center of gravity of the flap may be closer to the second edge than the first edge of the flap.

In another embodiment, the flap may include a main body made from plastic or polymer and a metallic rod attached to the second edge.

In another embodiment, the resilient member may be a spring or a torsion bar.

According to another aspect, an armrest console in a vehicle is provides. The armrest console comprises a storage compartment; a cover to conceal the storage compartment at a closed position, a storage tray, and a flap pivotally connected to a lower surface of the cover. The cover and a top edge of the storage tray defines an opening at the closed position; and the flap is configured to be retained to face the cover at a normal position and is rotated down to block the opening when a g-force exceeds a predetermined level.

In one embodiment, the flap is retained at the normal position by a resilient member. The flap and the resilient member are configured to provides a retaining force higher than a momentum of inertia of the flap such that the flap is retained at the normal position by the resilient member and the flap is rotated down when the g-force results in a momentum of inertia on the flap greater than the retaining force of the resilient member.

In another embodiment, the flap may include a main body, a first edge pivotally connected to the cover, a second edge opposite to the first edge and a center of gravity of the flap is closer to the second edge than the first edge of the flap.

In another embodiment, the storage tray is disposed in a front portion of the storage compartment.

According to yet another aspect, an armrest console in a vehicle is provides. The armrest console includes a storage compartment, a cover to conceal the storage compartment at a closed position; a storage tray disposed at a front portion of the storage department and spaced apart from the cover with an opening between a lower surface of the cover and the storage tray when the cover is at the closed position; a flap having a first edge, a second edge and a main surface; and a resilient member connected to the cover and the first edge of the flap. The first edge of the flap is pivotally connected to a lower surface of the cover along a width direction of the cover. A mass distribution of the flap and a retaining force of the resilient member are configured such that the flap is maintained at a normal position at which the main surface faces the lower surface of the cover, and the flap is rotated away from the lower surface of the cover when a g-force applied to the flap exceeds a predetermined level.

In one embodiment, the main surface of the flap may have an acute angle away from the lower surface of the cover at the normal position.

In another embodiment, the acute angle may be in a range of about 10 to 15 degrees.

In another embodiment, the flap may have a rectangular shape and is sized to block the opening between the lower surface of the cover and the storage tray when the flap is rotated down.

In another embodiment, the storage tray may include a front wall, and wherein the front wall is closer to a front of the armrest console than the first edge of the flap.

In another embodiment, a length of the flap between the first edge and the second edge may be greater than a distance between the lower surface of the cover and a top of the storage tray at the closed position such that the second edge extends into the storage tray and touches the front wall of the storage tray when the flap is rotated down from the normal position.

In another embodiment, the resilient member may be a spring.

In another embodiment, the flap may be configured to have different mass distribution, and a center of gravity of the flap is closer to the second edge than the first edge of the flap.

In another embodiment, the flap may include a main body made from plastic and a metallic rod attached to the second edge.

The predetermined g-force may occur during a crash event or a heaving breaking. As the flap is rotated down from the normal position at the predetermined g-force, the opening between the cover of the armrest console and the storage compartment or the storage tray is blocked by the flap. In this way, the small items held in the storage tray cannot be ejected during the crash event or the heavy breaking event.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed an inertia device in an armrest console in a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of the inertia devices in an armrest console are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
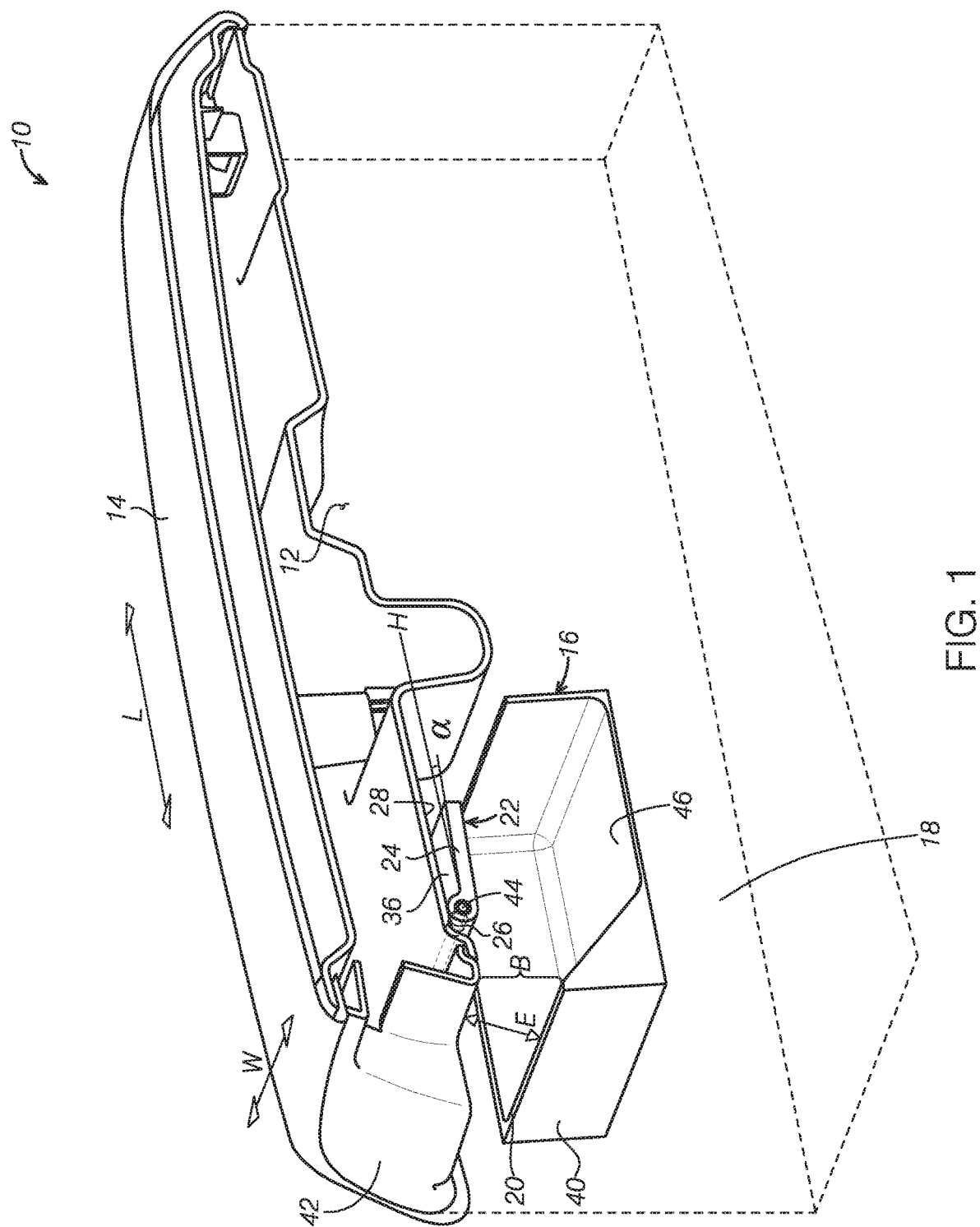
FIG. 1 is a schematic perspective view of an armrest console, illustrating a position of an inertia device attached under an armrest cover according to one embodiment of the present disclosure.

FIG. 1 is a schematic perspective view of an armrest console 10 in a vehicle, illustrating the armrest console 10 at a closed position. The armrest console 10 may be a center console between a driver seat and a front seat passenger seat. The armrest console 10 may include a storage compartment 12 and a cover 14 to conceal the storage compartment 12 at the closed position as shown in FIG. 1. A storage tray 16 may be disposed in the storage compartment 12. The storage tray 16 may be used to hold small items such as coins, keys, pens and mobile phones and may have a shallow depth. In some embodiments, the storage tray 16 may be located at a front portion 18 of the storage compartment 12. The front as used in the present application refers to the portion closer to a front of vehicle or the most forward part of the armrest console 10. In other words, the storage tray 16 may be positioned adjacent to or under a front portion of the cover 14 when the cover 14 is closed or the armrest console 10 is at the closed position. In some embodiments, an opening or a gap B exists between the cover 14 and a top edge 20 of the storage tray 16 at the closed position. At a heavy breaking or a crash event, the small items held in the storage tray 16 may exit through the opening B and enter a passenger compartment of the vehicle. To block the opening B under the heavy breaking or the crash impact, an inertia device 22 may be included in the armrest console 10.

Figure 2:
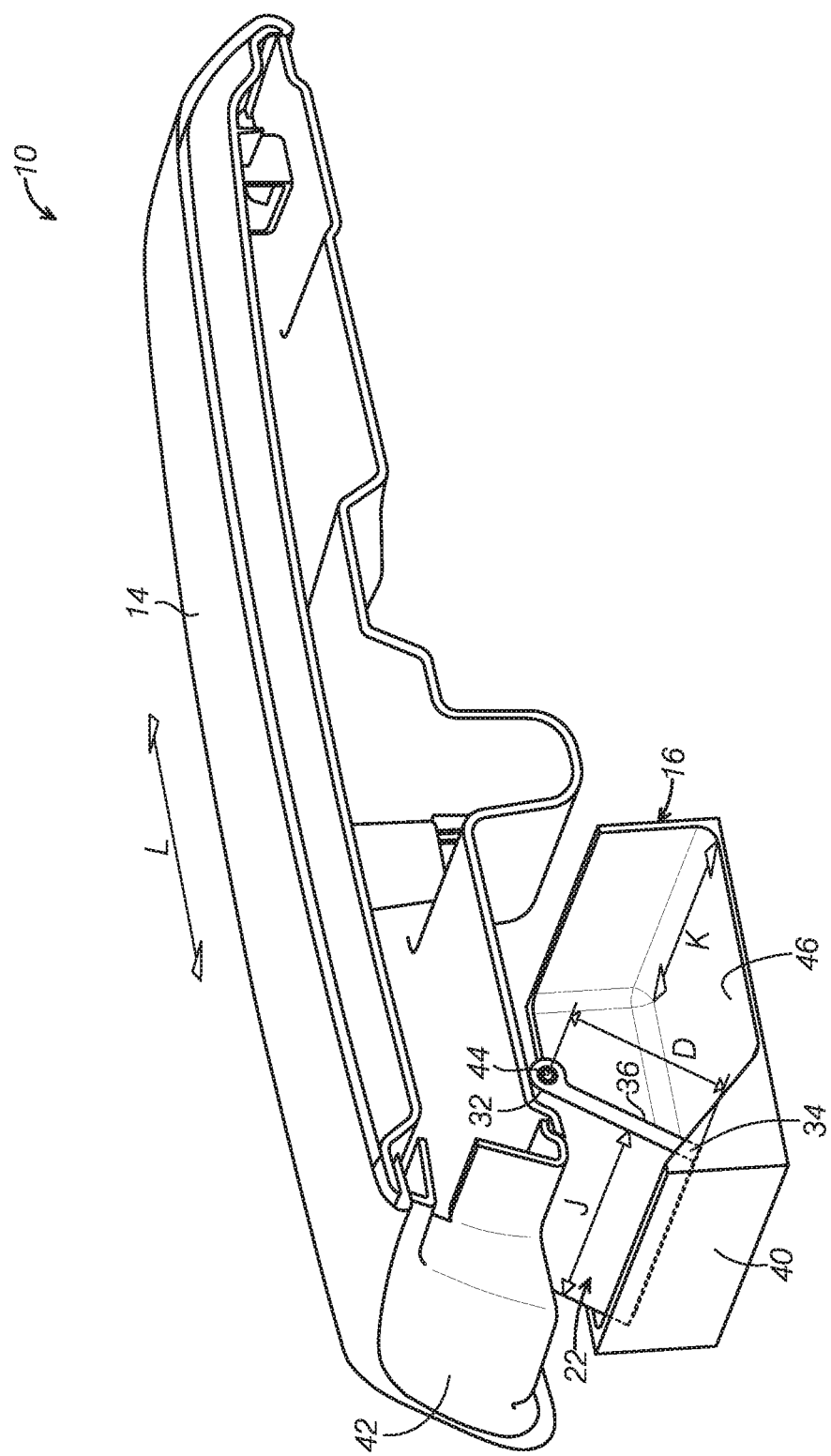
FIG. 2 is a schematic perspective partial view of the armrest console in FIG. 1, illustrating a use position of the inertial device when a G-force exceeds a predetermined level.
Figure 3:
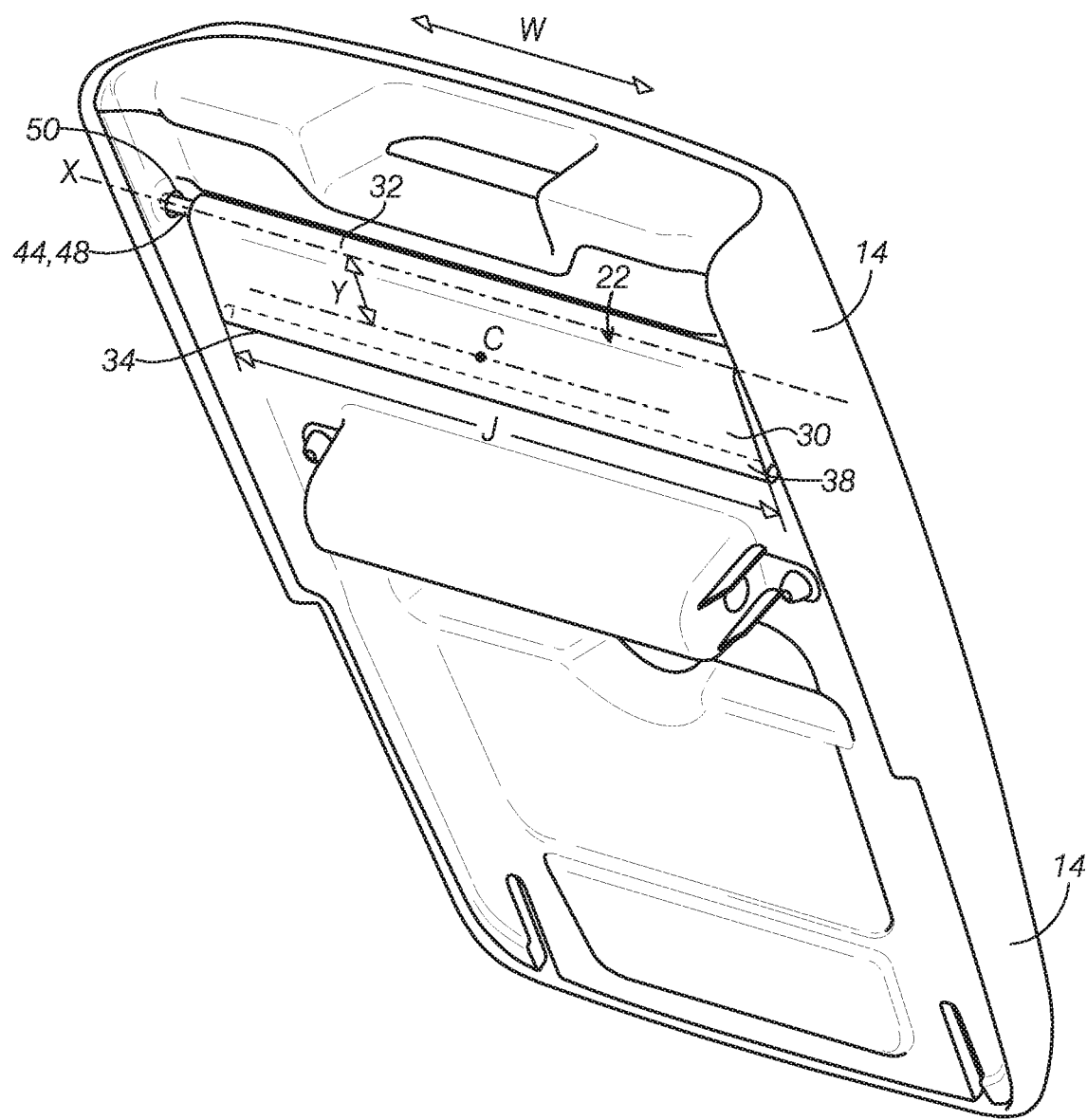
FIG. 3 is a perspective view of a cover of an armrest console according to another embodiment of the present application.

Now referring to FIGS. 1-3, the inertia device 22 is attached under the cover 14 of the armrest console 10. In some embodiments, the inertial device 22 may include a flap 24 and a resilient member 26 connected to the flap 24 and the cover 14. The flap 24 may be pivotally connected to a lower surface 28 of the cover 14 at a location adjacent to a front 42 of the cover 14. The flap 24 includes a main body 30, a first edge 32, and a second edge 34 opposite to the first edge 32. The first edge 32 is pivotally connected to the lower surface 28 of the cover 14 via a pivot 44 along a width direction W of the cover 14. FIG. 1 shows that the flap 24 is at a normal position when the cover 14 is closed and FIG. 3 shows that the flap 24 is at the normal position when the cover 14 is opened. At the normal position, a main surface 36 of the flap 24 faces the lower surface 28. The flap 24 is maintained by the resilient member 26 at the normal position no matter the cover 14 is opened or closed unless the flap 24 is impacted by an external force. The flap 24 and the resilient member 26 are configured such that the flap 24 is maintained at the normal position by a retaining force of the resilient member 26 and rotated downward from the normal position when a g-force applied to the flap 24 exceeds a predetermined level. For example, assuming that a mass of the flap 24 is m and a distance from a gravity center C to a pivot axis X is Y. A torque created by a momentum of the flap 24 can be calculated as follows:

$$T = m*G*Y.$$

The retaining force by the resilient member 26 to hold the flap 24 at the normal position may be calculated as follows considering a safe factor of 10%:

$$F = T*1.1.$$

If the resilient member 26 includes two springs, the retaining force of each spring may be calculated as follows:

$$F = T/2*1.1.$$

The flap 24 may be configured to have the momentum M corresponding to a predetermined g-force. When a force applied to the flap 24 is greater than the predetermined g-force, the momentum resulted from the applied force and the momentum M of the flap 24 is greater than the retaining force of the resilient member 26 and thus the flap 24 is rotated down from the normal position. In some embodiments, the flap 24 may have even mass distribution and may be made from material with greater density such as metal. In some embodiments, the flap 24 may be configured to have different mass distribution, and a gravity center C of the flap 24 is closer to the second edge 34 than the first edge 32 of the flap 24. In one example as illustrated in FIG. 3, the main body 30 of the flap 24 may be made from plastic and a metallic rod 38 may be attached to the second edge 34 of the flap 24 such that the gravity center C is closer to the second edge 34 than the first edge 32.

Referring to FIG. 1, in some embodiments, the flap 24 may be disposed to have an acute angle α to the lower surface 28 of the cover 14 at the normal position. That is, the main surface 36 of the flap 24 forms the angle α with a horizontal line H. The acute angle α may be in a range of about 5-20 degrees. In preferred embodiments, the angle α may be in a range of about 10-15 degrees. During a crash or a heavy breaking event, the resultant force on the flap 24 creates a downward momentum to push the flap 24 swing forward at the crash or the breaking event.

FIG. 2 shows a perspective partial view of the armrest console 10 and illustrates a use position of the inertial device 22 when a g-force exceeds a predetermined level. In the event when the vehicle is subject to sudden acceleration or deceleration such as a front crash or a heavy breaking, the g-force applied to the flap 24 can be greater than the predetermined level. When a sum of the momentum from the mass energy of flap 24 and the external force from the sudden acceleration or deceleration is greater than the retaining force of the resilient member 26, the flap 24 swings forward and block the opening B. In this way, the items in the storage tray 16 cannot be ejected.

The flap 24 may be sized to block the opening B between the lower surface 28 of the cover 14 and the top edge 20 the storage tray 16 at the use position. For example, a length D of the flap 24 between the first edge 32 and the second edge 34 is greater than a distance E between the lower surface 28 of the cover 14 and the top edge 20 of the storage tray 16 at the closed position. A width J of the flap 24 is slightly smaller than a width K between inner sidewalls of the storage tray 16 and can be received in the storage tray 16 at the use position. In the depicted embodiment, the flap 24 has a rectangular shape. It should be appreciated that the flap 24 may have any configuration to suit for the design of the armrest console 10.

As shown in FIGS. 1-2, the storage tray 16 is disposed at the front portion 18 of the armrest console 10 and includes a front wall 40. In some embodiments, the first edge 32 may be disposed away from the front wall 40 at a lengthwise direction L of the flap 24. In other words, the front wall 40 is closer to a front 42 of the cover 14 than the first edge 32 at the closed position. A projection of the first edge 32 on a bottom surface 46 of the storage tray 16 may be spaced away from the front wall 40. During a crash event or a heavy breaking event, the second edge 34 extends into the storage tray 16 and touches the front wall 40 of the storage tray 16 as the flap 24 swings forward. In the depicted embodiment, the main surface 36 of the flap 24 has an angle to the front wall 40 at the use position. In other embodiments, the projection of the first edge 32 on the bottom surface 46 of the storage tray 16 may be adjacent to the front wall 40. The second edge 34 extends into the storage tray 16 and is substantially parallel to the front wall 40 of the storage tray 16 as the flap 24 swings forward. In this embodiment, the flap 24 may touch or not touch the front wall 40.

Referring to FIGS. 1-2, the flap 24 is pivotally connected to the cover 14. In some embodiments, the inertia device 22 may include a pivot 44 connected to the lower surface 28 of the cover 14. The first edge 32 of the flap 24 may include a hole to receive the pivot 44 and thus rotatable around the pivot 44. The pivot 44 may be connected to the cover 14 via any appropriate method such as welding, clipping.

Figure 4:
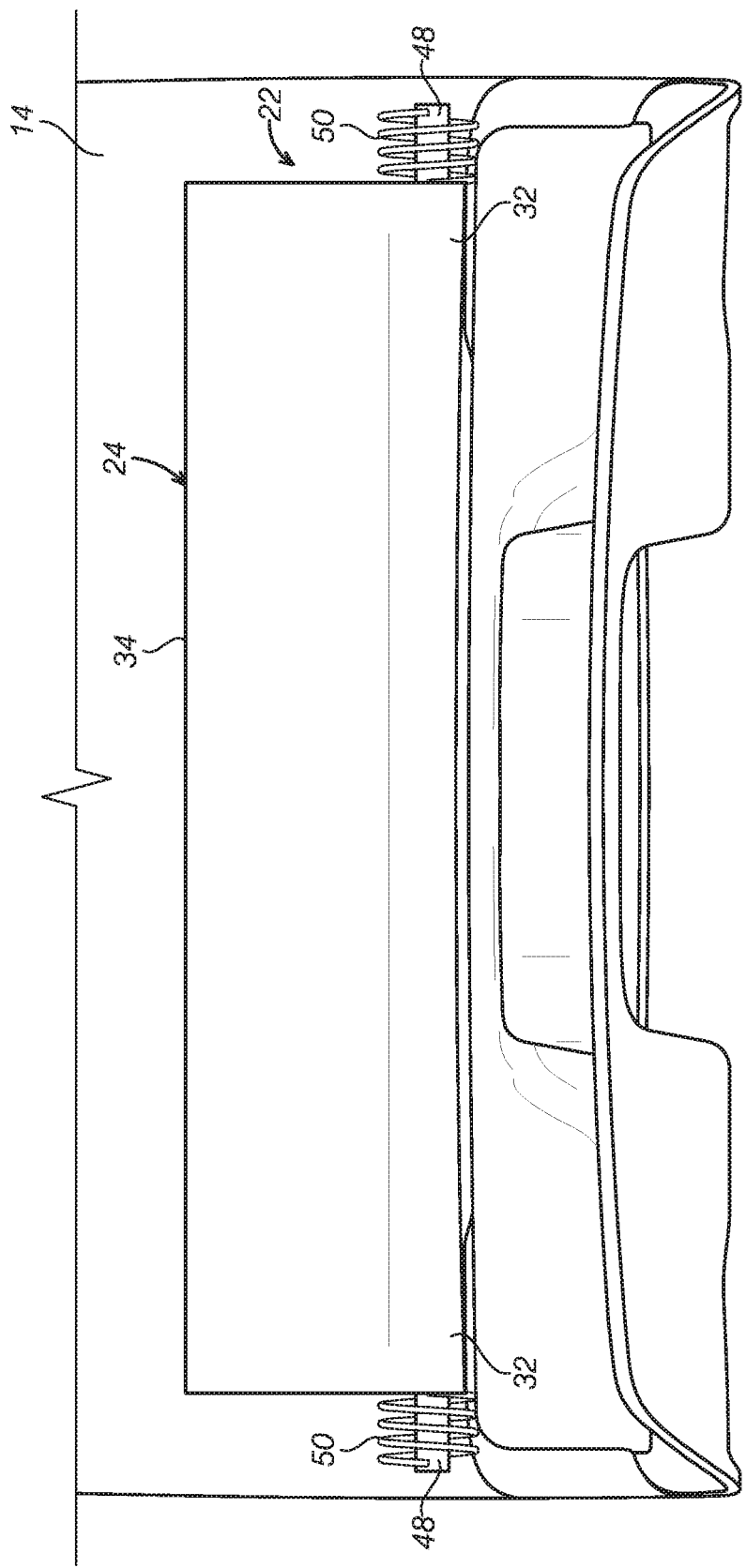
FIG. 4 is a plan view of a cover with an inertia device according to another embodiment of the present disclosure.
Figure 5:
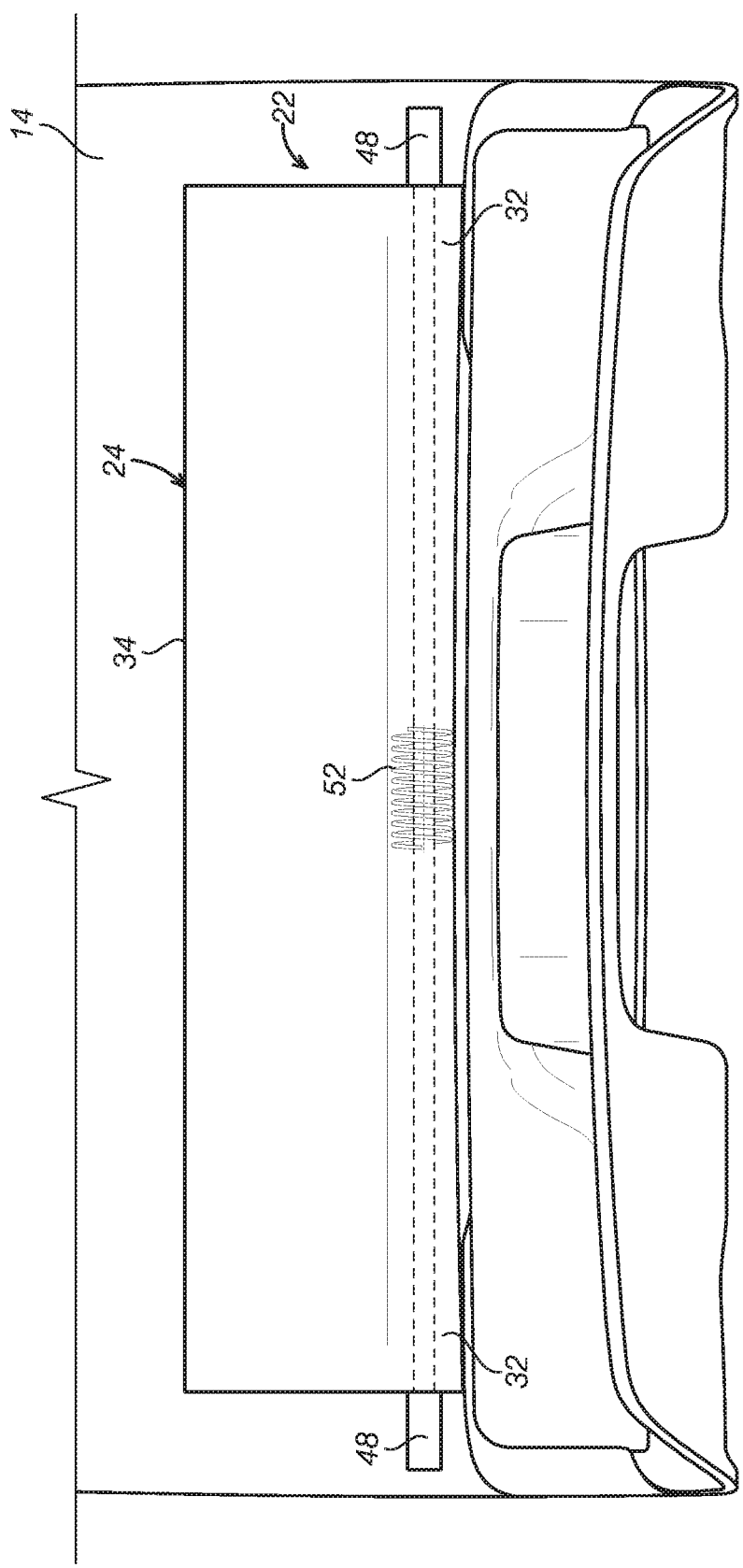
FIG. 5 is a plan view of a cover with an inertia device according to another embodiment of the present disclosure.

Referring to FIGS. 3-5, the inertia device 22 may include two protrusions 48 at two ends of the first edge 32 of the flap 24. The protrusions 48 may be an extension of the pivot 44 with which the flap 24 is rotatably connected. In some embodiments, the protrusion 48 may be received in a recess 50 on the cover 14 to be connected to the cover 14. It should be appreciated that the flap 24 may be connected to the cover 14 by any other appropriate approaches.

Now referring to FIGS. 4-5, in some embodiments, the resilient member 26 may include a coil spring connected to the flap 24 and the cover 14. FIG. 4 shows that two springs 50 are positioned at two ends of the first edge 32. As described above, the springs 50 may be configured to have a retaining force to maintain the flap 24 at the normal position and rotated down away from the normal position when a force applied to the flap 24 exceeds a predetermined level. The springs 50 may be coil springs. For example, one end of the spring 50 is connected to the cover 14 and the coil of the spring 50 is configured to receive the protrusion 48 and allow the rotation of the protrusion 48 inside the coil when a force is applied. In some embodiment as shown in FIG. 5, one spring 52 is disposed in a middle portion of the flap 24 and connected to the cover 14 and the flap 24. For the flap 24 with the same mass, the spring 52 would have a larger retaining force compare to the spring 50 of the embodiment in FIG. 4. The spring may be configured to have the required retaining force. For example, the spring retention torque force may be calculated based on the wire thickness, the pitch, the number of windings and the spring energy constant value. The spring load to hold the flap 24 may be configured to be 10% higher than a minimum load required for retaining the flap 24 so as to have a safe margin. In another embodiment, a torsion bar may be used as the resilient member. It should be appreciated that the resilient member 26 may be any suitable device that can hold the flap 24 up to a predetermined force and rotate down when a force applied to the flap 24 exceeds a predetermined level and return to the normal position when the applied force is removed.

In some embodiments, the inertia device 22 may be configured to have the flap 24 rotate down when a g-force exceeds a predetermined level depending on the need. For example, the predetermined G-force level may be set up to be greater such that the flap of the inertia device only rotates away from the normal position during a front crash event. In another example, the predetermined G-force level may be set up to be relative lower such that the flap of the inertia rotates away from the normal position during a heavy breaking event. Further, the inertia device may be configured so that the flap will return to the normal position after the crash event or the heavy breaking event. In this way, the flap of the inertial device can be used to block an exit of the small items from the storage tray.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An inertia device for being attached under a cover of an armrest console in a vehicle, comprising:
   a flap to be pivotally connected to a lower surface of the cover at a location adjacent to a front of the cover; and
   a resilient member connected to the flap and the cover, wherein the flap and the resilient member are configured such that the flap is maintained at a normal position by a retaining force of the resilient member and rotated downward from the normal position when a g-force applied to the flap exceeds a predetermined level.

2. The inertia device of claim 1, wherein the flap has a first edge to be pivotally connected to the lower surface of the cover via a pivot, a second edge opposite to the first edge and a main surface extending therebetween.

3. The inertia device of claim 2, wherein the resilient member includes two springs disposed adjacent to two ends of the first edge of the flap.

4. The inertial device of claim 2, wherein the resilient member includes one spring disposed in a middle of the first edge of the flap.

5. The inertia device of claim 2, wherein a center of gravity of the flap is closer to the second edge than the first edge of the flap.

6. The inertia device of claim 5, wherein the flap includes a main body made from plastic or polymer and a metallic rod attached to the second edge.

7. The inertia device of claim 1, wherein the resilient member is a spring or a torsion bar.

8. An armrest console in a vehicle, comprising:
   a storage compartment;
   a cover;
   a storage tray, wherein the cover and a top edge of the storage tray defines an opening at a closed position; and
   a flap pivotally connected to a lower surface of the cover, wherein the flap is retained to face the cover at a normal position and rotated down to block the opening when a g-force exceeds a predetermined level.

9. The armrest console of claim 8, wherein the flap is retained at the normal position by a resilient member, wherein the flap and the resilient member are configured to provide a retaining force higher than a momentum of inertia of the flap such that the flap is retained at the normal position by the resilient member and the flap is rotated down when the g-force results in a momentum of inertia on the flap greater than the retaining force of the resilient member.

10. The armrest console of claim 9, wherein the flap includes a main body, a first edge pivotally connected to the cover via a pivot, a second edge opposite to the first edge, and wherein a center of gravity of the flap is closer to the second edge than the first edge of the flap.

11. The armrest console of claim 10, wherein the storage tray is disposed in a front portion of the storage compartment.

12. An armrest console in a vehicle, comprising:
   a storage compartment,
   a cover to conceal the storage compartment at a closed position;
   a storage tray disposed at a front portion of the storage compartment and spaced apart from the cover with an opening between a lower surface of the cover and the storage tray when the cover is at the closed position;
   a flap having a first edge, a second edge and a main surface, and the first edge is pivotally connected to a lower surface of the cover along a width direction of the cover; and
   a resilient member connected to the cover and the first edge of the flap,
   wherein a mass distribution of the flap and a retaining force of the resilient member are configured such that the flap is maintained at a normal position at which the main surface faces the lower surface of the cover, and the flap is rotated away from the lower surface of the cover when a g-force applied to the flap exceeds a predetermined level.

13. The armrest console of claim 12, wherein the main surface of the flap has an acute angle away from the lower surface of the cover at the normal position.

14. The armrest console of claim 13, wherein the acute angle is in a range of about 10 to 15 degrees.

15. The armrest console of claim 13, wherein the flap has a rectangular shape and is sized to block the opening between the lower surface of the cover and the storage tray when the flap is rotated down.

16. The armrest console of claim 15, wherein the storage tray includes a front wall, and wherein the front wall is closer to a front of the armrest console than the first edge of the flap.

17. The armrest console of claim 16, wherein a length of the flap between the first edge and the second edge is greater than a distance between the lower surface of the cover and a top of the storage tray at the closed position such that the second edge extends into the storage tray and touches the front wall of the storage tray when the flap is rotated down from the normal position.

18. The armrest console of claim 12, wherein the resilient member is a spring.

19. The armrest console of claim 12, wherein the flap is configured to have different mass distribution, and a center of gravity of the flap is closer to the second edge than the first edge of the flap.

20. The armrest console of claim 19, wherein the flap includes a main body made from plastic and a metallic rod attached to the second edge.

* * * * *